Nov. 15, 1927.
W. P. ALBERT
1,649,643
SPRING DEVICE
Filed Nov. 22, 1922
3 Sheets-Sheet 1
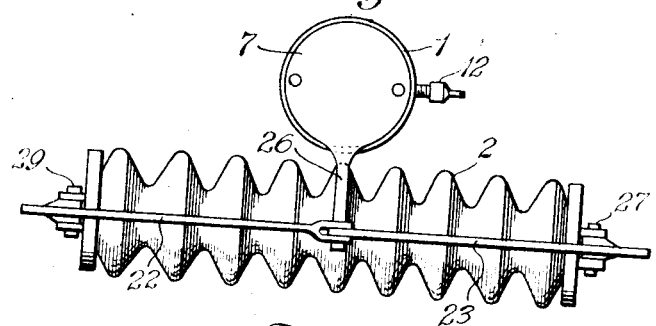
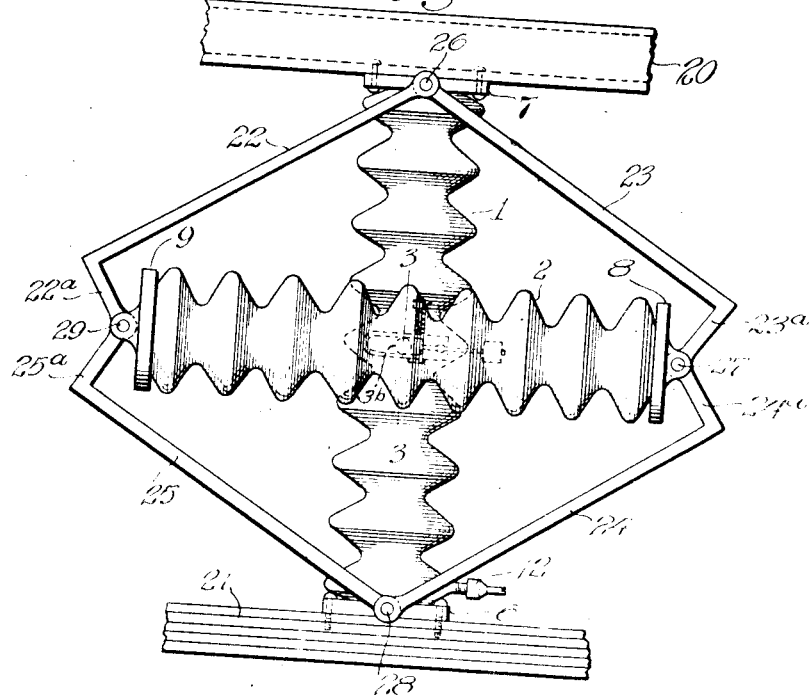
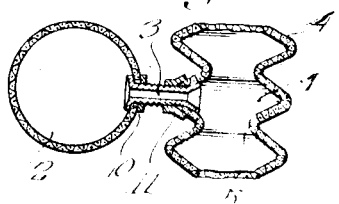
Inventor
W. P. Albert
By: [signature]
his att'y

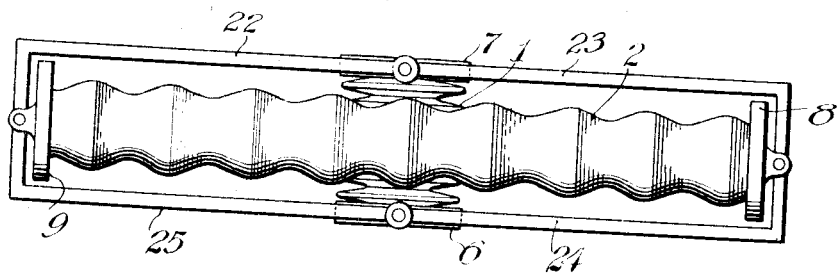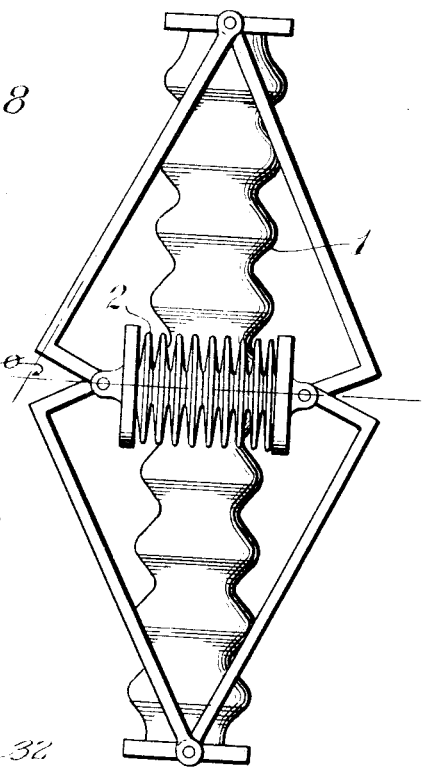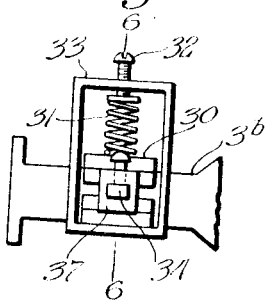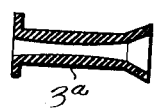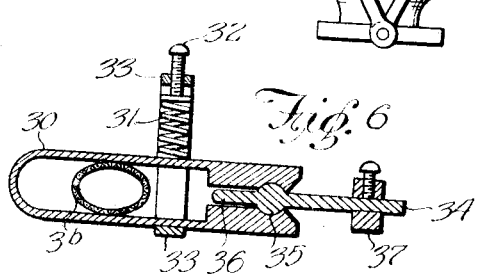

Nov. 15, 1927.
W. P. ALBERT
1,649,643
SPRING DEVICE
Filed Nov. 22. 1922
3 Sheets-Sheet 3
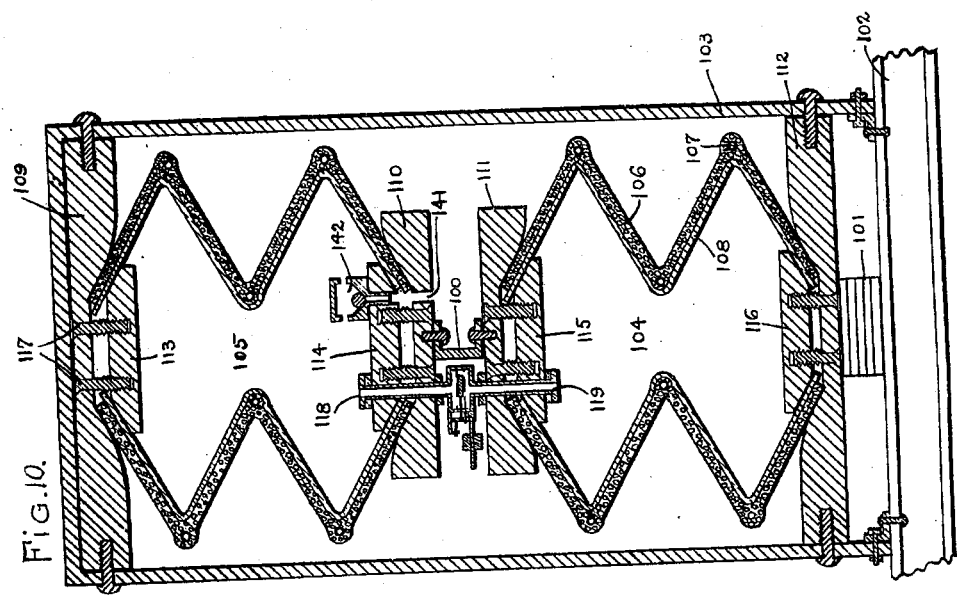
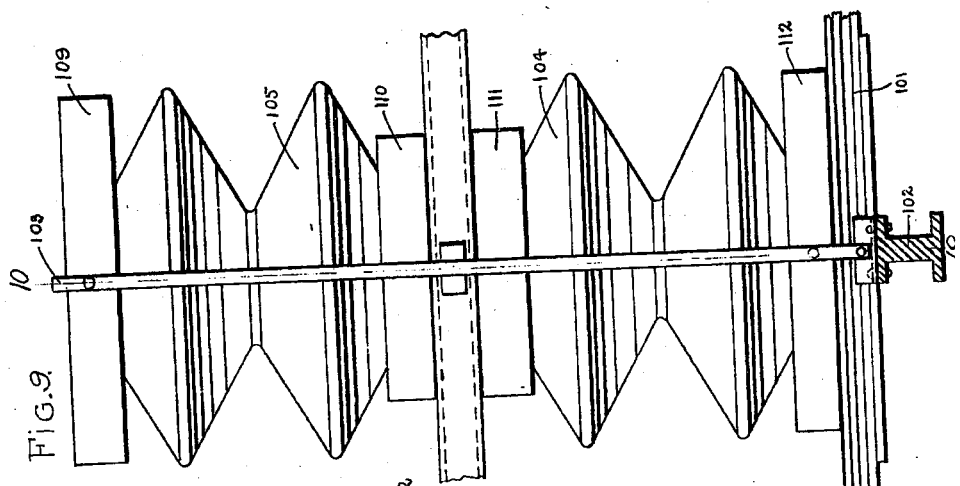
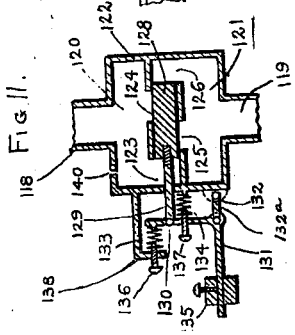

Patented Nov. 15, 1927.

1,649,643

UNITED STATES PATENT OFFICE.

WALTER P. ALBERT, OF EAST ORANGE, NEW JERSEY.

SPRING DEVICE.

Application filed November 22, 1922. Serial No. 602,576.

This invention relates to spring devices and more particularly to spring devices in which a fluid is used as the elastic element.

It is the object of this invention to provide a new and improved spring device of the above stated character and one which is simple and inexpensive in construction and efficient and certain in operation.

The device forming the subject of the present invention is used for controlling the relative movements of two members, such as the frame and axle of a vehicle, adapted to be caused to perform a primary and secondary movement, e. g. to approach and separate from each other. In accordance with the invention energy is generated during the initial or primary movement of said members, and this energy is used to counteract a secondary movement of said members, preferably, a fluid such as air is used for checking the relative movements of said members, separate fluid containers being provided for checking the relative movements in one and the opposite direction. The initial or primary movement of said members is preferably free, no matter in which direction it occurs, and part of the energy generated and stored during such movement will be utilized for checking the subsequent or secondary movement. A connection is provided between the two containers through which fluid may pass from one to the other.

In accordance with one of the features of the present invention, a valve or the like is provided in said connection whereby the passage of fluid from one container to the other is permitted only when the pressure in a container exceeds a predetermined amount. The valve may respond to pressures in one or both containers or it may respond to relatively different pressures in the containers.

In accordance with one embodiment of the invention, the two fluid containers are bellows interconnected by a tube. The compression and expansion of these bellows is preferably controlled by a parallelogram toggle frame. When this frame is distorted in the direction of one of its diagonals, then one, and when distorted in the direction of the other diagonal, then the other bellows is compressed. When one bellows is compressed, the other is expanded and vice versa. The frame and bellows are so arranged that the compression of one bellows opposes the movement of said members in one direction and that of the other in the opposite direction. Preferably, though not necessarily, the bellows are at right angles to each other. The force exerted in the direction of one diagonal of the parallelogram can be resolved into a force in the direction of the other diagonal by multiplying said force by the tangent of the angle formed by a side of the parallelogram and the first mentioned diagonal.

In accordance with a second embodiment of the invention, two bellows are provided, one between the two members (e. g. frame and axle of a vehicle) and the other above or below the members. The two bellows are alternately compressed and expanded during the approaching and separation of said member. They are interconnected in substantially the same manner as above described and air is permitted to pass from one to the other at certain predetermined pressures. Here again, the air in the bellows resisting the secondary movement, e. g. may be compressed to a relatively high pressure before the valve in the connection is actuated, and means must be provided rapidly to reduce in this bellows the air pressure to normal when the members approach each other because otherwise this bellows will aid the subsequent approaching tendency of said members.

These and other features of the invention will more clearly appear from the following descriptions of various embodiments of the inventive idea and the appended claims.

In the drawings various features of the invention are illustrated as embodied in a device adapted to act as a shock absorber or snubber for vehicles equipped with metallic springs. However, it will be obvious to those skilled in the art that the invention is applicable to act without the aid of metallic springs and may be utilized for responding to vibrations or shocks and acts as a suspension for other mechanisms than vehicles. Figs. 1–5 illustrate a preferred embodiment of the present invention. Fig. 1 is a plan view of the device having one form of connecting link between the bellows, Fig. 2 a side elevation of the device showing a valve controlled connecting link such as is more clearly illustrated in Fig. 6. Fig. 3 is a cross-section along lines 3—3 of Fig. 2 with the valve removed; Fig. 4 illustrates a modification of the connecting link between the vertical and horizontal bellows; Figs. 5 and 6 illustrate a further modification of this connecting link, Fig. 6 being a sectional view along lines 6—6 of Fig. 5. Figs. 7 and 8 show the device in various operated positions.

Figs. 9, 10 and 11 illustrate a second embodiment of various features of the present invention, Fig. 9 being a side elevation, Fig. 10 a cross section along lines 10—10 of Fig. 9, Fig. 11 an enlarged view of the valve mechanism.

The preferred structure consists of a vertical and a horizontal bellows 1 and 2 interconnected by means of a short metallic tube 3 of relatively slight cross section. The bellows may be constructed of any suitable material, but I prefer to use an outer casing 4 of rubber impregnated tire fabric and an inner casing 5 of rubber such as is used for inner tubes. The outer casing of the bellows are properly shaped to permit the collapsing and extending of the bellows and the inner tube 5 will follow the configuration of the outer casing. The two ends of each bellows are held in clamps 6, 7 and 8, 9 respectively, the construction of which will be more fully explained in connection with Fig. 10, and which serve to seal air tight the bellows and to clamp together the outer casing and inner tube. Similarly, one end of the tube 3 is held by means of a clamp 10 around an aperture in bellows 2 and the other end of this tube is held by means of a clamp 11 in an aperture of bellows 1. The bellows 1 is provided with a suitable valve 12. such as a Schrader valve, by means of which the bellows may be inflated and deflated. The clamps 6 and 7 are riveted or otherwise fastened to two members adapted to approach and separate from each other, in the present case to the frame 20 of a vehicle such as an automobile and the spring 21, respectively. The four ends of the bellows are mounted on the pivot points of a parallelogram toggle frame. This frame is composed of four links, 22, 23, 24 and 25. The adjacent ends of the links are pivoted on pins 26, 27, 28 and 29. The links are freely rotatable around these pins, one end of one link, such as 22 being forked as clearly shown in Fig. 1 to enclose the adjacent end of the other line 23. All the other links are similarly arranged. It should be noted however, that the pins 26 and 28 are longer than the pins 27 and 29 whereby the two bellows 1 and 2 will be held side by side. The adjacent ends of the links are bent at right angles to form ell ows 23ª, 24ª, 25ª and 22ª for the purpose of limiting the distortion of the parallelogram.

Before the device is placed on the vehicle, it is compressed into substantially the form shown in Fig. 7 and the bellows 1 is slightly inflated through the valve 12. When mounted on the vehicle it is fully inflated through valve 12 so that it will tend to assume the position shown in Fig. 2, i. e. a position in which the angle $\theta$ formed by the horizontal diagonal and a side of the parallelogram is 45°. This initial inflation of the device establishes a balance of pressures in the two bellows and the energy thus stored will in addition to supplementing the metallic spring in responding to slight vibrations, facilitate the passing of energy from one bellows to the other, i. e. the snubber action of the device in response to large primary movements. Without such reserve energy, it would be necessary first to generate such energy during the primary movement necessitating a relatively large structure, or provide means for supplying the energy from an outside source, e. g. air compressed by the engine of the vehicle, rendering the device more complicated. The size of the device is such that, when fully inflated, the vertical bellows 1 fills the space between 20 and 21 before the angle $\theta$ becomes 45°. Due to this the vertical bellows 1 tends to lift the frame 20 or cooperate with spring 21 in the lifting thereof and, as will be hereinafter set forth more in detail, will continue to do so while the angle $\theta$ is less than 45°. When for any reason the frame 20 and spring 21 are caused to approach each other and therefore the parallelogram distorted into the shape shown in Fig. 7, the bellows 1 will be compressed and the bellows 2 extended. On the other hand, when, during the rebound, the frame 20 and spring 21 tend to separate, the bellows 2 will be compressed and the bellows 1 extended. (Fig. 8.)

During the primary and secondary movements of 20 and 21, the air will always tend to flow through the tube 3 toward the bellows that is extended, this constituting the storing of energy generated by the primary movement of members 20 and 21. The energy thus passed through tube 3 during the primary movement, and stored as pressure in either one of the bellows will serve to check the following secondary movement before the members return to their initial position.

The passage of air out of the bellows compressed during the primary movement will tend to prevent the rebound or secondary movement first, by the fact that the pressure is partially relieved by this drain which in itself will tend to make the rebound less, and second the air which is passed through tube 3 performs the further function of assisting to check the rebound before the normal or starting point is reached by 20 and 21. A double action is thus produced to check the rebound.

The motion of frame 20 caused by a shock is a simple harmonic motion and when considered with respect to time can be resolved into a sine-wave. The time required for the turning movement is relatively long as shown by the sine-wave, as about seven-tenths of the movement occurs during the first quarter and the last quarter of the time interval, and the three-tenths occupied by the turning movement requires the other half of the time. This will give ample time for the dissipation of part of the energy stored during the primary movement. A part of this dissipated energy is used to check the secondary movement, said movement being indirectly checked also by the reduction of the energy which causes it. Not much air is passed from the compression chamber until the movement is practically checked, but air will pass before the rebound starts and, due to the construction of the device will flatten out the rebound movement.

The action of the vertical bellows 1 is always a force dependent upon the air pressure created therein and the cross section of this bellows. This force tends to separate the spring 21 and body or frame 20. The force exerted by the horizontal bellows 2 along the vertical axis is dependent upon the air pressure therein and its cross section and the tangent of the angle $\theta$ of the horizontal axis and a side of the parallelogram. This force is exerted in a direction tending to draw the spring 21 and frame 20 together. The algebraic sum of these two forces along the vertical axis gives at any instant the force exerted by the device upon the frame 20 and spring 21.

Since the pressures in each of the bellows at any given instant are dependent upon the rate of compression or expansion, it may be well to note that the rate of compression or expansion of the vertical bellows 1 is directly proportional to the rate of relative movement of the frame and spring, whereas the rate of compression or expansion of the horizontal bellows 2 is the rate of relative movement of the spring and frame multiplied by the tangent of the angle $\theta$. This accounts for the tremendous force exerted to check the rebound because, when the horizontal bellows 2 is most effective to check the vertical motion, the pressure is greatest in the horizontal bellows because its rate of compression is greatest. This great restraining force may be obtained without exceedingly high pressures in the horizontal bellows due to the fact that the pressure is multiplied by the tangent of the angle $\theta$. Even with a constant pressure instead of an increasing one in bellows 2, the retarding force preventing the separation of the frame 20 and spring 21 increases very rapidly when the parallelogram is distorted into the position of Fig. 8.

The interconnecting pipe 3 may be modified in the manner shown in Fig. 4 or Figs. 5 and 6. As shown in Fig. 4 the connecting link 3ᵃ is made of rubber or other resilient material the opening through which is normally nearly closed and is opened in proportion to the difference in pressure in bellows 2 and 1. Similarly the interconnecting pipe 3ᵇ shown in Figs. 2, 5 and 6 is normally closed by means of a clamp 30 which is held closed by means of a spring 31 placed under tension by a screw 32 which is adjustably supported in a frame 33 surrounding the clamp 30. If the pressure of the air forced through the tube 3ᵇ is sufficient to overcome the tension of spring 31 then air will pass from one bellows into the other. The opening and closing of the clamp 30 is controlled also by means of a lever 34 which is pivoted within the jaws of the clamp 30 at 35 and which by means of a projection 36 may pry open the clamp. A weight 37 is slidably adjustable on the lever 34 and due to its kinetic inertia will aid the opening of the clamp 30 when the frame 20 is checked in its movement down or up.

Referring now to Figs. 9, 10 and 11, 100 is the frame, 101 the spring and 102 the axle of a vehicle. A U-bolt 103 which is riveted or clamped to the axle supports two bellows 104 and 105. The bellows are composed of an outer casing 106 of tire fabric, reinforced by suitable means such as wires 107. The inner casing 108 is of rubber and may be a section of an inner tube. The two ends of each casing are held by means of clamps 109, 110, 111 and 112. The clamps are hollowed out in their center within which fit wedges 113, 114, 115 and 116, respectively. The ends of the inner and outer casings of a bellows are placed between the co-acting faces of a wedge and a clamping disc 109—113 and are clamped tight by means of screws such as 117. The discs 111 and 110 are attached to the frame 100, and these discs as well as their cooperating wedges 114 and 115 are traversed by tubes 118 and 119. The ends of these pipes 118 and 119 terminate in chambers 120 and 121, respectively, provided within a casing 122. Air may pass from one chamber into the other through openings 123, 124, 125 and 126, however, normally communication between these chambers is blocked by means of a plunger 128. The plunger is carried by a rod 129 pivoted at 130 on one arm of an L shaped lever 131. The L shaped lever 131 is loosely mounted on the casing 122 at 132 through a loose link 132ᵃ whereby the free movement of the plunger 128 and rod 129 is insured. Its clockwise or counterclockwise rotation being controlled by springs 133, 134 and a weight 135. The weight 135 is horizontally adjustable on the other arm of the L shaped lever 131, and the springs 133, 134 may be tensioned by means of screws 136 and 137, the former of which is provided in a shoulder 138 of the casing 122 and the latter in the vertical arm of the L shaped lever 131.

The upper chamber 120 is provided with a pinhole 140 through which communication may be had with the outside atmosphere.

The disc 110 and wedge 114 are perforated at 141 this opening being controlled by a ball-valve 142.

When the frame 100 and axle 102 are caused to approach each other, the bellows 104 will be compressed and the bellows 105 extended. Due to the extension of the bellows 105, the air pressure therein will be reduced whereby the ball-valve 142 will be opened and the bellows 105 connected with the outside atmosphere through opening 141. On the other hand, the air in bellows 104 will be gradually compressed tending thus to retard the relative movements of the frame 100 and axle 102. The springs 133 and 134 and the weight 135 are so adjusted that when the air pressure applied through the duct 119 to the right hand end of the plunger 128 reaches a certain pressure, e. g. 60 pounds per square inch, the plunger will be displaced from its position shown in Figs. 10 and 11 and pushed against the action of spring 133 in a left hand direction. This movement of the plunger 128 is aided also by the weight 135, which, as the downward movement of the frame 100 is retarded, tends to rotate the L-shaped lever 131 in a counter-clockwise direction. When the plunger is thus displaced air will pass from the bellows 104 through the pipe 119 and chamber 121 and then through openings 126 and 124 into the bellows 105. Thus it will be seen that under the control of the plunger 128 the pressure within the bellows is maintained at a maximum, the creation of an excess pressure being prevented by causing the air to pass into the bellows 105.

The driving of air from 104 to 105 will continue as long as there is a tendency further to compress the air in 104. An excess pressure will be created in 105 by passage of air from 104 which will cause the closing of the valve 142. When the compression of bellows 104 ceases, the plunger 128 will again return to its normal position shown in Fig. 9 and the bellows 105 and 104 will be again separated. However, at this time, we have an excess pressure in bellows 105 which will serve to absorb or deaden the rebound of the frame 100. While the frame 100 is caused to approach clamp 109, the bellows 105 is compressed and the bellows 104 is extended. The extension of the bellows 104 is without noticeable effect but the compression of bellows 105 will cause the further compression of the air therein. When the air pressure in the bellows 105 exceeds the pressure in bellows 104, the plunger 128 is operated against the action of spring 134 and moves in a right hand direction rotating the L shaped lever in a clockwise direction. As was the case in the previous instance, the rotation of the lever 131 and therefore the displacing of the plunger 128 is aided by the kinetic inertia of the weight 135 which is now caused to continue its upward movement. Air may now pass through openings 123 and 125 into the bellows 104 whereby pressure within bellows 105 will be prevented from exceeding a certain maximum and energy is stored in the bellows 104 in the form of compressed air for the purpose of counteracting the downward movement of the frame 100.

Part of the air drawn into 105 through ball-valve 142 on the downward movement of frame 100 and possibly all the air passed from 104 to 105 on the compression of 104 is pumped back into 104 on compression of 105. In other words, a certain pressure is maintained in bellows 104 due to pump action of bellows 105 and this pressure tends to lift the weight of the frame off of metallic springs. Pressure in 104 is prevented from becoming excessive because of the above described valve action. The pressure in 104 is normally higher than in 105 except on a rebound. Here, as in the previous case, due to the passage of air from 104 to 105 on compression of 104, the retarding action of 105 begins before the normal or starting point is reached and increases very rapidly after the normal position is passed. The retarding force is determined also by the intensity of the initial movement or in other words by the amount or volume of air passed from 104 to 105 on compression of 104.

When the pressure in the bellows 105 falls below the pressure in bellows 104, the plunger 128 will be brought back to its normal position shown in Fig. 9 and the passage of further air from bellows 105 to 104 prevented. Air escaping through pinhole 140 will continuously decrease the pressure in the bellows 105 until, when it falls below atmospheric pressure, the ball-valve 142 will be again opened, permitting the rushing in of air. The hole 140 is so small that the escape of air therethrough will not appreciably interfere with the action of this bellows 105 to deaden the rebound of the frame. However, air will be escaping through it continuously and when shortly after the tendency of frame 100 to approach clamp 109 ceases, the pinhole 140 together with the extension of the bellows 105 will be sufficient to re-establish the atmospheric pressure in the bellows. Furthermore, some air will be escaping through the opening provided in casing 122 for the rod 129. As a matter of fact, this opening may be provided large enough whereby the provision of a separate pinhole becomes unnecessary. The rapid re-establishment of atmospheric pressure within tne bellows 105 after the frame 100 is again caused to approach the axle 102, is of great importance because otherwise the air pressure in bellows 105 would cause to speed up the downward travel of the frame which of course would be undesirable.

What I claim is:

1. In a device for controlling primary and secondary relative movements of two members, two fluid containers normally under relatively high pressure and normally exerting a pressure on said members, and means for compressing the fluid in one container during the primary and in the other during the secondary movement.

2. In a device for controlling primary and secondary relative movements of two members, two chambers, means for compressing the air in one chamber during the primary and in the other chamber during the secondary movement, means for maintaining in the normal position of said members equal and higher than atmospheric pressures in said chambers and extendible means cooperating with one of said chambers and responsive to the air pressure therein for forcing said members apart.

3. In a device for controlling primary and secondary relative movements of two members, two fluid containers, means for balancing the pressures in said containers by establishing equal but higher than atmospheric pressures therein, means operative at equal pressures in said containers for separating said members, means for increasing the pressure in one container and decreasing it in the other during the primary and vice versa during the secondary movement, and means for reestablishing the balanced pressures in said containers.

4. In a device for controlling primary and secondary relative movements of two members, two fluid containers normally under equal but higher than atmospheric pressures, means for varying the pressure of the fluid in one container during the primary and in the other container during the secondary movement, and means for passing a quantity of fluid from one to the other when any difference in relative pressures exists in said containers.

5. In a device for controlling primary and secondary relative movements of two members, two fluid containers normally under equal but higher than atmospheric pressures and normally tending to separate said members, means for varying the pressure of the fluid in one container during the primary and in the other during the secondary movement, and means for passing a quantity of fluid from one container to the other when the pressure therein exceeds a certain value.

6. In a device for controlling primary and secondary relative movements of two members, two bellows, means for compressing one and extending the other one of the bellows during the primary movement and vice versa during the secondary movement, a communicating passage between said bellows through which a quantity of air may be passed from one bellows to the other when certain relative pressures are established, and means for maintaining equal pressures in said bellows in the normal position of said members, the equal pressures being higher than atmospheric and lower than the maximum of said relative pressures.

7. In a device for controlling primary and secondary relative movements of two members, two fluid containers, means for compressing the fluid in one container during the primary and in the other during the secondary movement, a connection between said containers through which fluid may pass, a weight arranged to follow within certain limits the movements of said members, and means operative in the two extreme positions of said weight for aiding in the opening of said connection.

8. In a device for controlling primary and secondary relative movements of two members, two fluid containers, means for compressing the fluid in one container during the primary movement, a connection between said containers through which fluid may pass, controlling means for said connection, and a weight forming part of and mounted on said controlling means in a manner to perform an oscillatory movement following the movements of said members to aid in the opening of said connection near the end of each movement.

9. In a device for controlling primary and secondary relative movements of two members, two fluid containers normally under equal but higher than atmospheric pressures, and a toggle frame connected with said members, and containers to compress the fluid in one during the primary and in the other during the secondary movement.

10. In a device for controlling primary and secondary relative movements of two members, two fluid containers arranged to resist said movements, links interconnecting said containers and members, the linking being connected in such a manner that the force exerted by the fluid in one container is determined by the tangent of the angle formed by the axis of this container with an adjacent link.

11. In a device for controlling primary and secondary relative movements of two members, two fluid containers arranged to resist said movements, a toggle frame for compressing one or the other container in response to said movements so arranged that the force exerted by the compressed fluid in one container is determined by the tangent of the angle formed by the axis of this container with the connected toggle arm.

12. In a device for controlling primary and secondary relative movements of two members, two fluid containers for resisting said movements, a toggle frame through which said containers are connected with said members and with each other, said frame being so arranged that the rate of compression and expansion of fluid in one container is proportional to the rate of said movements, and the rate of compression and expansion of the fluid in the other container is determined by the rate of said movement multiplied by the tangent of the angle formed by the axis of the last mentioned container with the frame member connected therewith.

13. In a device for controlling primary and secondary relative movements of two members, two fluid containers for resisting said movements, a toggle frame through which said containers are connected with said members and with each other, said frame being so arranged that the rate of compression and expansion of fluid in one container is directly proportional to the rate of said movements, and the rate of compression and expansion of the fluid in the other container is determined by the rate of said movements multiplied by the tangent of the angle formed by the axis of the last mentioned container with the frame member connected therewith.

14. In a device for controlling primary and secondary relative movements of two members, two fluid containers for resisting said movements, connections between said containers and members to compress the fluid in one container during the primary and in the other container during the secondary movement, said connection being so arranged that the retarding force of the compressed fluid in one container increases rapidly with the rate of relative movement of said members.

15. In a device for controlling primary and secondary relative movements of two members, two flexible containers of fluid arranged to resist said movements, mechanical means for resolving the primary and secondary movements into the compression and expansion, respectively, of said containers, said mechanical means being so arranged that the retarding force of the fluid in one container increases rapidly with the rate of one of said movements.

16. In a device for controlling primary and secondary relative movements of two members, two fluid containers, a parallelogram frame for said containers, means including said frame for compressing the fluid in one container during the primary and in the other during the secondary movement, and a connection between said containers through which compressed air may pass from one to the other.

17. In a device of the character described, two members caused to approach and separate from each other, two containers of air, means for compressing the air in one container during the approach and in the other container during the separation of said members, a connection between said containers for passing compressed air from one to the other, a valve in said connection, and variable adjustable means including a weight and a spring for actuating said valve when certain air pressures are created in said containers.

18. In a device of the character described, two members caused to perform primary and secondary movements, two containers of air, means for compressing one container during the primary and the other container during the secondary movement, a connection between said containers from passing air from one to the other, a valve in said connection responsive to predetermined air pressure in either container, and a weight the inertia of which aids the opening of the valve during either movement of said members.

19. In a device of the character described, two members moved to and from each other, a first fluid container for checking the approach and a second fluid container for checking the separation of said members, and a parallelogram toggle frame connected with said members at two diagonally opposite points, with one of said containers at said two points, and with the other container at the two other diagonally opposite points.

20. In a device of the character described, two members caused to approach and separate from each other, two bellows containing air, a parallelogram frame for said bellows, means including said frame for compressing one bellows during the approach and the other during the separation of said members, and a connection between said bellows for passing compressed air from one to the other.

21. In a device of the character described, two members caused to approach and separate from each other, two containers of air, means for compressing the air in one container during the approach and in the other container during the separation of said members, a tube between said containers for passing compressed air from one to the other, a spring-pressed clamp surrounding said tube, means including a weight for actuating said clamp when certain air pressures are created in said containers.

22. In a device of the character described, two members caused to approach and to separate from each other, a resilient means counteracting the approaching of said members, a resilient means counteracting the separation of said members, means for independently affecting said members by said means upon slight relative movements of said members, and means for causing the resilient means jointly to affect said members upon large relative movements thereof.

23. In a device of the character described, two members caused to approach and separate from each other, two containers of air, means for compressing the air in one container during the approach and in the other container during the separation of said members, a chamber in which said containers terminate, a plunger separating said chamber into a compartment for each container, one end of said plunger being exposed to one and the other to the other compartment, communicating channels between said compartments exposed in the actuated positions of said plunger, a lever controlling the movement of said plunger, adjustable springs bearing on said lever, and an adjustable weight on said lever.

24. In a device for controlling primary and secondary relative movements of a vehicle and an axle, a metallic spring and two fluid containers for resisting said movements, a mechanical connection between said containers and said vehicle and axle, the normal pressure in said containers acting through said connection being such as to aid said spring in bearing the weight of the vehicle, and means responsive to the creation of excessive pressures in one of said containers for passing part of the compressed fluid into the other container.

25. In a device for controlling primary and secondary relative movements, resilient means responsive to all relative movements of said members, and means including said resilient means for snubbing only large relative movements.

26. In a device of the character described, two members caused to perform primary and secondary relative movements, a resilient means counteracting the primary and a second resilient means counteracting the secondary movement, means for independently affecting said members by said two resilient means upon slight relative movements of said members, and means responsive to a relatively large primary movement for proportionally increasing the extent to which said second resilient means is made effective.

27. In a device for controlling primary and secondary relative movements of two members, two fluid containers, means for compressing one container in response to a primary and the other in response to a secondary movement, and an expansible passageway interconnecting said containers through which fluid may pass from one to the other.

28. A shock absorber comprising an upper chamber and a lower chamber, a partition separating said chambers, said partition having a relatively small opening therethrough, and said chambers having a sealed wall of flexible material, and air under a predetermined compression contained within said chambers.

29. A shock absorber for a vehicle comprising a tubular corrugated casing filled with compressed air, means to support one end of said casing upon an axle of the vehicle, means attached to said casing between the ends thereof for securing said casing to the frame of said vehicle, and a partition arranged transversely of said casing and having a restricted passage therethrough.

30. A shock absorber for a vehicle comprising a tubular expansible casing containing a medium under compression, means to support one end of said casing upon an axle of the vehicle, means attached to said casing between the ends thereof for securing said casing to the frame of said vehicle, and a partition arranged substantially in alinement with said second means and transversely of said casing, said partition having a restricted passage therethrough forming a communication between opposite ends of said casing.

31. A shock absorber comprising a tubular expansible casing, a partition dividing said casing into two chambers, said partition having an opening therethrough to form a communication between said chambers, and means to support said casing between the frame of a vehicle and the axle thereof, whereby one of said chambers is arranged to be compressed by an impact upon said axle and the other of said chambers is arranged to be compressed under the rebound from said impact.

32. A shock absorber comprising a tubular expansible casing, a partition dividing said casing into two chambers, said partition having an opening therethrough to form a communication between said chambers, and means to support said casing between two relatively movable parts, whereby an impact on one part causes one of said chambers to be compressed and the rebound from said impact causes the other of said chambers to be compressed.

33. A shock absorber comprising two chambers separated from each other, a relatively small opening through which said chambers may communicate with each other, said chambers having sealed walls of flexible material, and air under a predetermined compression maintained within said chambers.

34. A shock absorber for a vehicle comprising two chambers enclosed by a tubular corrugated casing filled with compressed air, means for mounting said casing between the axle and frame of the vehicle, and a restricted passage through which said chambers are interconnected.

In witness whereof, I hereunto subscribe my name this 21st day of November, 1922.

WALTER P. ALBERT.